G. W. MALLORY.

Boat-Lowering Apparatus.

No. 5,512. Reissued July 29, 1873.

Witnesses:

Arnold Hornemann

W. C. Dey.

Inventor:

Geo. W. Mallory.

by his atty F. L. Sutton.

New York

THE NORRIS PETERS CO., WASHINGTON, D. C.

UNITED STATES PATENT OFFICE.

GEORGE W. MALLORY, OF MYSTIC BRIDGE, CONNECTICUT.

IMPROVEMENT IN BOAT-LOWERING APPARATUS.

Specification forming part of Letters Patent No. 112,939, dated March 21, 1871; reissue No. 5,512, dated July 29, 1873; application filed July 14, 1873.

*To all whom it may concern:*

Be it known that I, GEORGE W. MALLORY, of Mystic Bridge, in the county of New London and State of Connecticut, have invented a new and valuable Improvement in Boat-Davits, of which the following is a specification:

The invention relates to means for facilitating the movement of the boats outboard and inboard.

The following is a description of what I consider the best means of carrying out the invention. The accompanying drawing forms a part of this specification.

Figure 1:
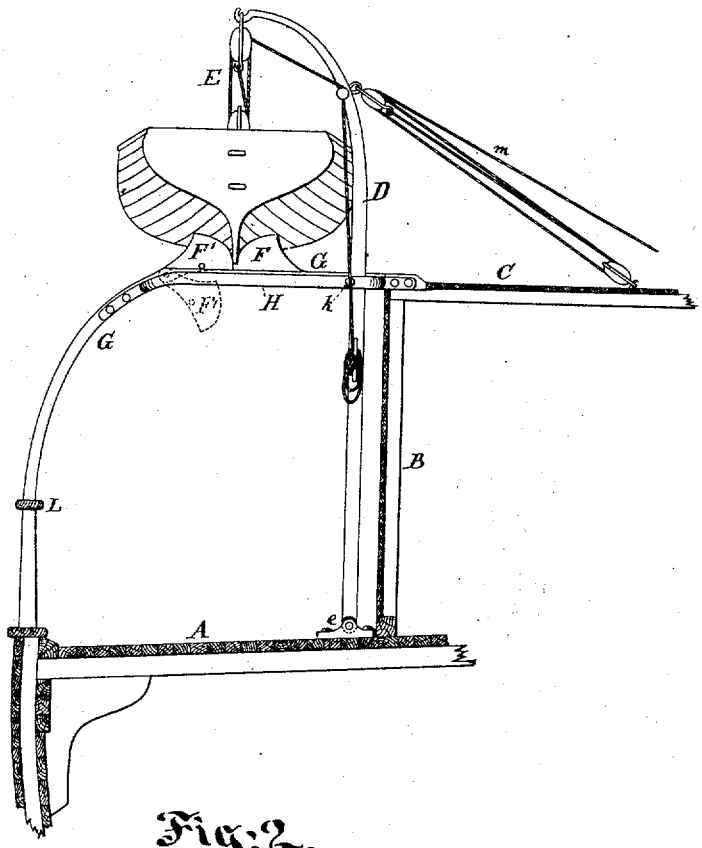
Figure 2:
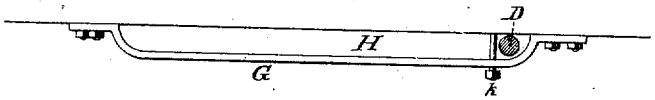

Figure 1 is a vertical cross-section of a portion of a vessel with my davits, and Fig. 2 is a plan view of a portion on a larger scale.

Similar letters of reference indicate like parts where they occur in each.

A represents the deck of a steamboat or other vessel. B represents the cabin side, and C the hurricane-deck. D represents the after davit, provided with an elongated vertical stem, which is hinged to a block, *e*, secured to the deck A. F F′ represent chocks secured to the horizontal portion of the bearer G. The inner part F is fixed rigidly, while the outer part F′ is pivoted, and is designed to be readily dropped when the boat is to be moved outward and lowered away. H represents a slot in the bearer G, in which the davit moves, and which limits its motion. A small bolt, *k*, is inserted horizontally and transversely through the bearer G near its inner end, and serves to keep the davit in vertical position when the boat is stowed. The hinge, at the lower end of the davit, is placed at a sufficient distance from the side of the vessel to admit of the boat being stowed on her chocks between the davit and the rail. L represents the rail at the side of the vessel. The slotted bearers G extend upward from the rail at the bow and stern of the boat for a certain distance, and then turn and stretch horizontally to the hurricane-deck. The boat is thus always outside of the davits, ready for immediate use. When the boat is introduced to or taken from the water the davit is in an inclined position, resting against the outer end of the slot H. After the boat has been hoisted, by means of the tackle E, a sufficient distance, each davit is brought to the perpendicular by means of the small tackle *m*, in which position it is retained by means of the bolt *k*.

To lower away the boat it is only necessary to drop the outside half F′ of each chock, draw out the small bolt *k*, and slack up the tackle *m*, when the davits will move along the slots in the bearers, carrying the boat outside of the rail, in position to be readily lowered to the water.

The forward davit, with its attachments, is similar in construction and arrangement to the after davit above described.

What I claim as new, and desire to secure by Letters Patent, is—

1. The davits D hinged at *e*, sufficiently inboard to allow the boat to be stowed between the hinged davits and the vessel's side, with the davits always in position on the same side of the boat, as herein specified.

2. The hinged davits D, turning on the hinges *e*, in combination with chocks F F′, the outermost of which is removable, so as to avoid a necessity for hoisting the boat out of the chocks, as herein specified.

3. The guide G, secured firmly to the vessel, and combined with a hinged davit, D, arranged to traverse outboard and inboard, as herein specified.

GEO. W. MALLORY.

Witnesses:

W. C. EDGECOMB,

J. A. RATHBUN.